(12) United States Patent
Gaultier

(10) Patent No.: US 6,328,218 B1
(45) Date of Patent: Dec. 11, 2001

(54) ELECTRONIC CARD IDENTIFICATION METHODS

(75) Inventor: Jean-Marie Gaultier, Rousset (FR)

(73) Assignee: STMicroelectronics S.A., Gentilly (FR)

( * ) Notice: Subject to any disclaimer, the term of this patent is extended or adjusted under 35 U.S.C. 154(b) by 0 days.

(21) Appl. No.: 09/428,862

(22) Filed: Oct. 28, 1999

(30) Foreign Application Priority Data

Oct. 30, 1998 (FR) .................................................... 98 13684

(51) Int. Cl.⁷ .................................................... G06K 19/06
(52) U.S. Cl. .......................................... 235/492; 235/380
(58) Field of Search .................................. 235/492, 384, 235/380; 370/95.1, 95.2

(56) References Cited

U.S. PATENT DOCUMENTS

| | | | |
|---|---|---|---|
| 5,425,032 | * | 6/1995 | Shloss et al. .......................... 370/95 |
| 5,541,928 | | 7/1996 | Kobayashi et al. ..................... 370/95 |

FOREIGN PATENT DOCUMENTS

| | | |
|---|---|---|
| 2 758 027 | 7/1998 | (FR) . |
| WO 98/32237 | 7/1998 | (WO) . |

OTHER PUBLICATIONS

French Search Report dated Jul. 14, 1999 with annex to French Application No. 98/13684.

* cited by examiner

*Primary Examiner*—Harold I. Pitts
(74) *Attorney, Agent, or Firm*—Lisa K. Jorgenson; Stephen Bongini; Fleit, Kain, Gibbons, Gutman & Bongini P.L.

(57) ABSTRACT

A method is provided for identifying electronic cards. According to the method, an interrogation message is sent to the electronic cards, and at least two different types of markers are sent to the electronic cards. The markers of the first type determine the time slots in the sequence, and the markers of the second type cause the electronic cards to change to predetermined states. In a preferred method, the identification method is interrupted when a marker of the second type is sent. Also provided is a method of identifying electronic cards by receiving an interrogation message from an interrogation unit, and at least two different types of markers are received from the interrogation unit. The markers of the first type determine the time slots in the sequence, and the markers of the second type cause the electronic cards to change to predetermined states. Additionally, communication systems of the type in which an interrogation unit identifies electronic cards are provided.

23 Claims, 1 Drawing Sheet

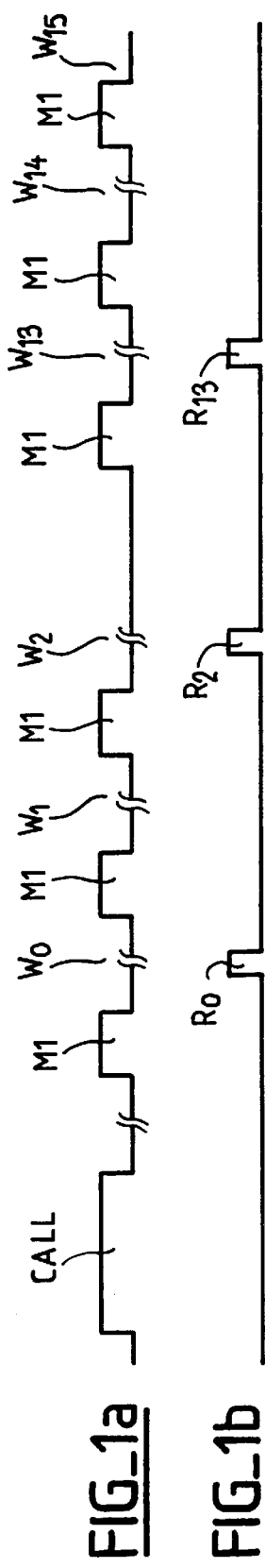
FIG_1a
FIG_1b
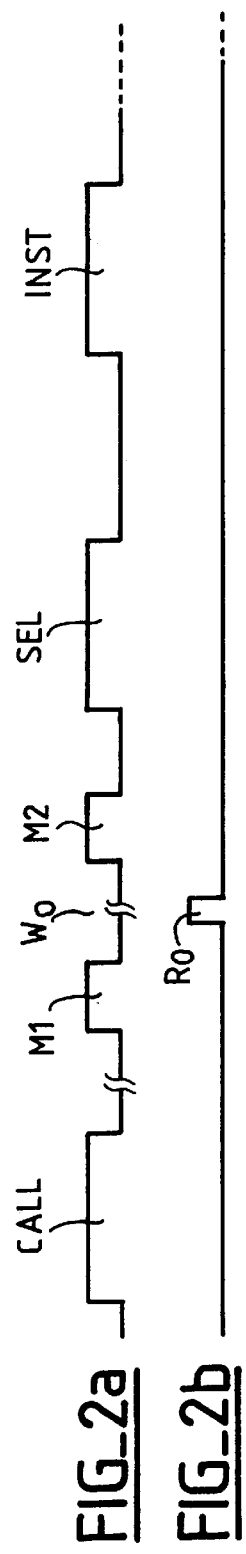
FIG_2a
FIG_2b
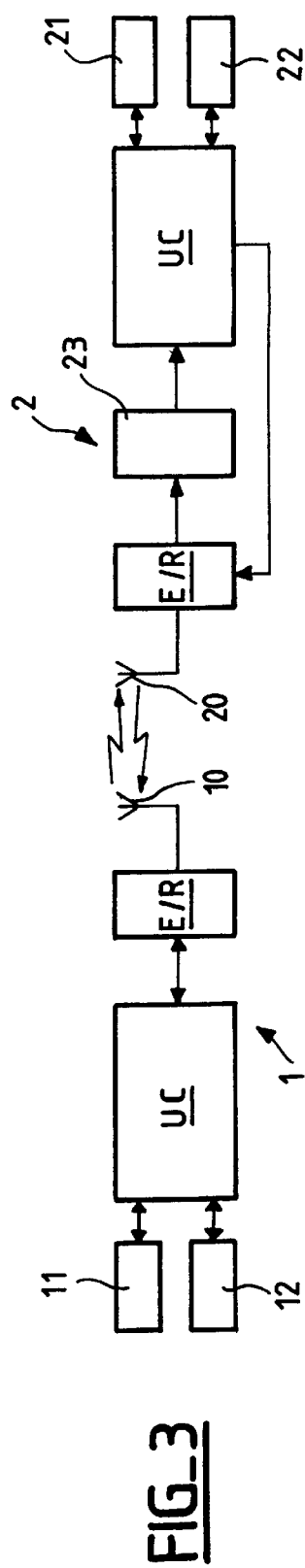
FIG_3

ELECTRONIC CARD IDENTIFICATION METHODS

CROSS-REFERENCE TO RELATED APPLICATIONS

This application is based upon and claims priority from prior French Patent Application No. 98-13684, filed Oct. 30, 1998, the entire disclosure of which is herein incorporated by reference.

BACKGROUND OF THE INVENTION

1. Field of the Invention

The present invention relates to electronic cards, and more specifically to electronic card identification methods for use with electronic cards that communicate with an interrogation unit.

2. Description of Related Art

Typically, electronic cards respond to interrogation messages from an interrogation unit. Such a process is generally carried out in a system that includes a fixed interrogation unit which can dialogue (i.e., exchange messages) with electronic cards which are mobile with respect to the interrogation unit. In other systems, the interrogation unit is mobile and the electronic cards are fixed. In still other systems, both the interrogation unit and the electronic cards are mobile. In the present description, an electronic card includes any type of "card" such as an electronic module, a badge, or a chip card that can be carried on the person, in a vehicle, on an apparatus, on livestock, or the like. Further, the interrogation unit can be contained in any type of terminal such as a base station, an access control terminal, a stopless toll terminal, or the like.

The dialogue between the interrogation unit and the electronic cards is a contactless type of dialogue. For example, the messages are sent via a radio-frequency or microwave electromagnetic carrier wave. The transmission channel is thus formed by the ambient surroundings. It must therefore be time shared in accordance with a communication protocol between the unit and the cards, in particular to avoid collisions between messages sent to or coming from different electronic cards.

The protocol generally used is of the master/slave type. Indeed, each exchange of message between the interrogation unit (master) and a given card (slave) is initiated by the interrogation unit. The cards are maintained in a specific state, referred to as the standby state, until awakened (activated) by a wake-up message (call) sent by the unit. The latter then sends a command message. When the command is executed, the unit sends a standby message to the card, causing the latter to return to the standby state. In this way, in normal operation, at most only one card is activated at a time to receive a command message. Any other cards that are present are not affected by this command message.

An identification number is allocated univocally to each electronic card. In other words, a unique identification number is associated with each electronic card. This allocation can be made statically or dynamically. In the static case, an identification number is permanently allocated to each card, for example at the time of its manufacture. In the dynamic case, an identification number is randomly generated and allocated to each card when it comes within range of a zone for exchanging messages. Because of the mobility of the electronic cards and/or because of its own mobility, the interrogation unit has no immediate way of knowing whether electronic cards are within the zone for exchanging messages.

In particular, the interrogation unit does not know how many cards are present and above all, it does not know which of the cards are present. It has been proposed to enable the interrogation unit to identify the electronic cards that are present in the zone for exchanging messages. In the following description, this zone shall be called the investigation zone, given that it is a zone within which the electronic cards present are identified. The identification of an electronic card present requires a determination of its identification number.

The conventional processes all operate under the same principle. An interrogation message is sent by the interrogation unit to all the cards present in the investigation zone. All the cards present, or just those which are authorized to respond, then send a response message. The interpretation of the response messages received makes it possible to determine the identification number of all of the cards present, either directly or following an iterative procedure. This exchange of messages necessary for identifying the cards present is referred to as the identification procedure.

The conventional processes differ from one another first by the content of the response message and also by the sequence of response messages sent by the different cards. In order to avoid the problem of possible collisions between the response messages sent by two of more of the cards present, processes have been proposed in which the cards respond to an interrogation message by sending their identification number in a specific time slot within a sequence of n time slots (where n is a whole number greater than or equal to two). Each card is allocated a unique specific time slot, possibly dynamically (i.e., as a function of the number of cards effectively present), so as to be the only card to send a response message inside that time slot.

Another conventional identification process involves reconstituting the identification numbers of the cards present in blocks of Q bits following a branch-structured iterative algorithm in which the response message sent by the cards present (and authorized to respond) includes at least one service bit sent inside a narrow time slot whose positioning within a sequence of $2^N$ successive and identical time slots indicates the value of a block of bits not yet identified by its identification number.

Such a process is described in French patent application No. 98-01309, which is assigned to STMicroelectronics S.A. of France. While this process provides good results, improved electronic card identification methods are still desired.

A characteristic common to the above-described processes is that the electronic cards respond by sending a response message, whatever its nature, in a given time slot within a sequence of time slots. In view of the synchronization constraints between the interrogation unit and the responding cards, the width of a time window is in practice about a hundred times greater than the time taken to send a response message. The process described in the above-mentioned French patent application improves the process insofar as it allows the use of narrower time slots. Nevertheless, the time slots sequences overall still occupy a relatively long time period. During this period, the interrogation unit waits for messages and cannot dialogue with any card, even one that has already been the identified, since the channel is "reserved" for the transmission of response messages from the card.

SUMMARY OF THE INVENTION

In view of these drawbacks, it is an object of the present invention to overcome the above-mentioned drawbacks and to provide improved electronic card identification methods.

Another object of the present invention is to provide communication systems that implement improved electronic card identification methods.

One embodiment of the present invention provides a method of identifying electronic cards. According to the method, an interrogation message is sent to the electronic cards, and at least two different types of markers are sent to the electronic cards. The markers of the first type determine the time slots in the sequence, and the markers of the second type cause the electronic cards to change to predetermined states. In a preferred method, the identification method is interrupted when a marker of the second type is sent.

Another embodiment of the present invention provides a method of identifying electronic cards. According to the method, an interrogation message is received from an interrogation unit, and at least two different types of markers are received from the interrogation unit. The markers of the first type determine the time slots in the sequence, and the markers of the second type cause the electronic cards to change to predetermined states. In one preferred method, at least one of the electronic cards is set to a standby state when a marker of the second type is received.

Further embodiments of the present invention provide communication systems of the type in which an interrogation unit identifies electronic cards.

Other objects, features, and advantages of the present invention will become apparent from the following detailed description. It should be understood, however, that the detailed description and specific examples, while indicating preferred embodiments of the present invention, are given by way of illustration only and various modifications may naturally be performed without deviating from the present invention.

BRIEF DESCRIPTION OF THE DRAWINGS

FIGS. 1a and 1b are timing diagrams of the signals exchanged between an interrogation unit and three electronic cards for a case in which the identification procedure is completely executed;

FIGS. 2a and 2b are timing diagrams of the signals exchanged for a case in which the identification procedure is interrupted; and FIG. 3 is a block diagram of an exemplary system for implementing the identification method of the present invention.

DETAILED DESCRIPTION OF PREFERRED EMBODIMENTS

Preferred embodiments of the present invention will be described in detail hereinbelow with reference to the attached drawings.

The following description illustrates the principles of the present invention in the context of a particularly simple example of a method for identifying electronic cards. However, the present invention is not limited to such an embodiment. In the exemplary embodiment described below, the electronic cards possess an identification number encoded on four bits. A maximum of 16 cards can therefore be present in the investigation zone, with the card identification numbers being from 0 to 15 (in decimal notation). This number is stored in a memory of the card. The principles of the identification method according to this embodiment of the present invention shall first be described with reference to FIGS. 1a and 1b for a case in which the identification procedure is completely executed.

FIG. 1a is a timing diagram of the signals sent by the interrogation unit during the identification procedure and FIG. 1b is a timing diagram of the signals sent in response by the cards present. First, the interrogation unit sends an interrogation message CALL. This message is received by all the cards present in the interrogation zone and has the effect of awakening them so that they set themselves to the awake (or active) state. In this state, the cards listen on the transmission channel to detect markers sent by the interrogation unit after the CALL message.

In the example shown in FIG. 1a, the unit sends 16 consecutive markers M1 of a first type. In this embodiment, each marker is a binary word encoded on p bits, such that it can be received and decoded by the reception mechanism in the electronic cards. For example, the value p=3 may be chosen. A marker such as the markers M1 then has a value such as "010" (using binary notation). However, in further embodiments, a marker can be a particular waveform, (e.g., a voltage pulse whose type within the meaning of the present invention is determined according to whether the voltage has a positive or negative sign).

The function of the markers M1 is to indicate the start of the time slots within which the interrogation unit waits for possible response messages. Consequently, the sequence of 16 markers M1 sent by the interrogation unit determines a sequence of consecutive time slots denoted W0, W1, W2, . . . , W13, W14, and W15 (FIG. 1a). Preferably, the markers M1 are sent periodically such that the time slots have the same width. While this is not obligatory, it is simpler to implement. In practice, the goal is to create time slots whose width is as small as possible, taking into account the synchronization constraints of the transmission and reception mechanisms of the interrogation unit and the cards. The duration of the identification procedure is thereby minimized.

The markers are received and decoded by the electronic cards present. Upon receipt of each marker M1, a counter internal to the cards is incremented by one unit (the counter having been initialized to zero upon reception of the CALL message). The value of this counter is constantly compared with the identification number of the card. In the case where the compared values are equal, the card sends a response message inside the time slot whose starting point is time referenced by the last marker M1 received. In a particularly simple example, the response message is a single bit with a value of 1. FIG. 1b shows the response messages R0, R2, and R13 sent by three electronic cards present whose identification numbers are respectively 0, 2, and 13 (in decimal notation). As can be seen, these response messages are inside time slots W0, W2, and W13, respectively.

FIGS. 2a and 2b show the timing diagrams of the signals exchanged for a case in which the identification procedure is not completely executed (i.e., when it is interrupted before the end of the sequence of the 16 time slots). This situation can arise in a specific application when the master unit urgently needs to engage a transaction with an electronic card that it has just identified. In this case, it is assumed that the same three cards as in the previous case are in the investigation zone. Everything goes on just as in the previous case until the card whose identification number is 0 sends its response message R0.

Upon receiving this response message, the interrogation unit sends a second marker M2 of the same nature as marker M1 but of a second type, which is different from that of marker M1. In the example, this second marker M2 is also a binary word encoded on three bits, but it has a value that is different than the value of marker M1. For example, the second marker can have a value of "011" (in binary notation). The function of marker M2 is to cause the cards to change to a predetermined state, for example to the standby state. An auxiliary function of marker M2 is to cause the interruption of the identification procedure.

In order to engage a transaction with an electronic card (e.g., the one whose identification number is 0 and which has just been identified, or possibly another card that had already been identified during a previous identification procedure), the master unit sends a wake-up (or select) message SEL which activates that card. The SEL message thus enables the selection of a particular card. For that purpose, it includes that identification number of the card as a parameter. The other cards remain in their standby state. The master unit then sends one or several command messages, such as the message INST shown in FIG. 2b, in order to carry out a transaction.

Accordingly, the markers sent by the master unit after the interrogation message have two distinct functions depending on their value. Thus, it is possible to interrupt the identification procedure before the end of the sequence of time slots W0 to W15, for example to carry out a priority transaction with one of the cards already identified. Note that in the example described with reference to FIGS. 2a and 2b, the procedure is interrupted upon receiving the first response message R sent by a card present. However, it can be interrupted in the same way at any other moment. The moment of this interruption is not necessarily linked to the response messages sent by the cards present. Indeed, an interruption of the identification procedure can be provoked by the master unit for any reason whatever.

Moreover, the number of possible values for the markers is not limited to two. In the above example, it can be at the most equal to eight. However, in practice, that number can be adapted to the number of different functions attributed to the markers according to their type or value. Furthermore, the present invention finds applications in all types of identification processes in which electronic cards respond to an interrogation message by sending a response message in a specific time slot within a sequence of time slots. Therefore, the present invention is not limited to the very simple example of a process like that described above.

FIG. 3 is a block diagram of an exemplary system for implementing the identification method of the present invention. An interrogation unit (or master unit) 1 includes a command unit UC such as a microprocessor. The command unit UC has a program memory 11 which stores a program for managing the system's own application, as well as a program for implementing the identification procedure. It can store in a data memory 12 the identification numbers of the cards it has identified. The interrogation unit 1 also includes a transmission mechanism E/R coupled to an antenna 10 for transmitting or receiving messages managed by the command unit.

A card 2 also has a command unit UC which typically is only capable of carrying out a small number of simple operations such as reading from and writing into a memory. The card includes a transmission/reception mechanism E/R coupled to both an antenna 20 and the command unit UC through an interpretation module 23. The interpretation module 23 interprets the information received by the card to determine whether it is a wake up (call) message, a command message, or a marker. In the latter case, the interpretation module determines the type or value of that marker so as to activate the corresponding inputs of the command unit UC as appropriate. The command unit UC of the card 2 is also coupled to a memory 21 that stores the identification number of the card, and a counter 22 whose function has been described above. The command unit UC is preferably also directly coupled to the card's transmission/reception mechanism E/R for transmitting the response messages.

While there has been illustrated and described what are presently considered to be the preferred embodiments of the present invention, it will be understood by those skilled in the art that various other modifications may be made, and equivalents may be substituted, without departing from the true scope of the present invention. Additionally, many modifications may be made to adapt a particular situation to the teachings of the present invention without departing from the central inventive concept described herein. Furthermore, an embodiment of the present invention may not include all of the features described above. Therefore, it is intended that the present invention not be limited to the particular embodiments disclosed, but that the invention include all embodiments falling within the scope of the appended claims.

What is claimed is:

1. A method of identifying electronic cards of the type in which the electronic cards respond to an interrogation message from an interrogation unit by sending response messages in specific time slots within a sequence of time slots, said method comprising the steps of:
   sending the interrogation message to the electronic cards; and
   sending at least two different types of markers to the electronic cards,
      wherein the markers of the first type indicate the start of each of the time slots in the sequence, and
      the markers of the second type cause the electronic cards to change to predetermined states.

2. The method as defined in claim 1, further comprising the step of interrupting the identification method when a marker of the second type is sent.

3. The method as defined in claim 1, further comprising the step of setting at least one of the electronic cards to a standby state after a marker of the second type is sent.

4. The method as defined in claim 1, further comprising the step of interrupting the identification method and setting at least some of the electronic cards to a standby state after a marker of the second type is sent.

5. The method as defined in claim 1, further comprising the step of activating at least one of the electronic cards and setting the remaining electronic cards to a standby state after a marker of the second type is sent.

6. The method as defined in claim 1, further comprising the step of activating at least one of the electronic cards, setting the remaining electronic cards to a standby state, and sending at least one command message to the activated electronic cards after a marker of the second type is sent.

7. The method as defined in claim 1, wherein each of the markers is a binary word encoded on p bits, where p is greater than or equal to 1.

8. A method of identifying electronic cards of the type in which the electronic cards respond to an interrogation message from an interrogation unit by sending response messages in specific time slots within a sequence of time slots, said method comprising the steps of:
   receiving the interrogation message from the interrogation unit; and
   receiving at least two different types of markers from the interrogation unit, wherein the markers of the first type indicate the start of each of the time slots in the sequence, and the markers of the second type cause the electronic cards to change to predetermined states.

9. The method as defined in claim 8, further comprising the step of setting at least one of the electronic cards to a standby state when a marker of the second type is received.

10. The method as defined in claim 8, further comprising the step of activating at least one of the electronic cards and setting the remaining electronic cards to a standby state when a marker of the second type is received.

11. The method as defined in claim 8, further comprising the step of activating at least one of the electronic cards, setting the remaining electronic cards to a standby state, and receiving at least one command message for the activated electronic cards after a marker of the second type is received.

12. The method as defined in claim 8, wherein each of the markers is a binary word encoded on p bits, where p is greater than or equal to 1.

13. A communication system including an interrogation unit for identifying electronic cards, said interrogation unit comprising:

means for sending an interrogation message to the electronic cards; and means for sending at least two different types of markers to the electronic cards, wherein the markers of the first type indicate the start of each time slot in a sequence of time slots within which the interrogation unit waits for possible response messages from the electronic cards, and the markers of the second type cause the electronic cards to change to predetermined states.

14. The communication system as defined in claim 13, wherein said interrogation unit further comprises means for interrupting electronic card identification when a marker of the second type is sent.

15. The communication system as defined in claim 13, wherein said interrogation unit further comprises means for activating at least one of the electronic cards after a marker of the second type is sent.

16. The communication system as defined in claim 13, wherein said interrogation unit further comprises means for activating at least one of the electronic cards and sending at least one command message to the activated electronic cards after a marker of the second type is sent.

17. The communication system as defined in claim 13, wherein each of the markers is a binary word encoded on p bits, where p is greater than or equal to 1.

18. A communication system of the type in which an interrogation unit identifies electronic cards, each of said electronic cards comprising:

means for receiving an interrogation message from the interrogation unit; and means for receiving at least two different types of markers from the interrogation unit, wherein the markers of the first type indicate the start of each time slot in a sequence of time slots within which the interrogation unit waits for possible response messages from the electronic cards, and the markers of the second type cause the electronic cards to change to predetermined states.

19. The communication system as defined in claim 18, wherein each of said electronic cards further comprises means for selectively setting the electronic card to a standby state when a marker of the second type is received.

20. The communication system as defined in claim 18, wherein each of said electronic cards further comprises means for selectively activating the electronic card or setting the electronic card to a standby state after a marker of the second type is received.

21. The communication system as defined in claim 18, wherein each of said electronic cards further comprises means for receiving at least one command message when the electronic card is activated.

22. The communication system as defined in claim 18, wherein each of the markers is a binary word encoded on p bits, where p is greater than or equal to 1.

23. The communication system as defined in claim 18, wherein each of said electronic cards further comprises:

means for interpreting received information; and means for determining the type of a received marker.

* * * * *